(12) United States Patent
Chan

(10) Patent No.: US 12,355,823 B2
(45) Date of Patent: Jul. 8, 2025

(54) METHOD OF EXTENDING PBX COMMUNICATION FUNCTIONS AND CONNECTIVITY

(71) Applicant: Charles Lap San Chan, Hong Kong Island (HK)

(72) Inventor: Charles Lap San Chan, Hong Kong Island (HK)

( * ) Notice: Subject to any disclaimer, the term of this patent is extended or adjusted under 35 U.S.C. 154(b) by 236 days.

(21) Appl. No.: 18/087,800

(22) Filed: Dec. 22, 2022

(65) Prior Publication Data

US 2023/0231888 A1    Jul. 20, 2023

(30) Foreign Application Priority Data

Jan. 14, 2022   (TW) .................................. 111101741

(51) Int. Cl.
*H04L 65/1056* (2022.01)
*H04L 65/1069* (2022.01)

(52) U.S. Cl.
CPC ...... *H04L 65/1056* (2013.01); *H04L 65/1069* (2013.01)

(58) Field of Classification Search
CPC .......................... H04L 65/1056; H04L 65/1069
See application file for complete search history.

(56) References Cited

U.S. PATENT DOCUMENTS

2002/0094070 A1*   7/2002   Mott ..................... H04M 15/80
                                                          379/112.01

* cited by examiner

*Primary Examiner* — Duc C Ho
(74) *Attorney, Agent, or Firm* — Cheng-Ju Chiang

(57) ABSTRACT

The present invention discloses a method of extending PBX communication function and connectivity. The present invention may use the original telephone exchange to execute the communication via network other the PSTN connection. The edge device connected with the telephone exchange is allowed to inquire and automatically updates the edge device data list per se, therefore to establish the connections rapidly. On the other hand, the present method of extending PBX communication function and connectivity can further extend new applicable functions. For instance, the edge device may have the functions of encryption and decryption. When the telephone exchange communicates with the edge device, the communication therebetween will be encrypted. Moreover, the advanced functions provided by edge device such as the multimedia communication, leading the communications between the telephone exchanges to have the aforementioned advanced functions, too.

15 Claims, 3 Drawing Sheets

METHOD OF EXTENDING PBX COMMUNICATION FUNCTIONS AND CONNECTIVITY

CROSS REFERENCE TO RELATED APPLICATIONS

The present invention claims benefit of Taiwan Application No. 111101741 filed in Taiwan Intellectual Property Office on Jan. 14, 2022, the disclosure of which is incorporated by reference herein.

TECHNICAL FIELD

The present invention is related to a method of extending PBX (Private Branch eXchange) communication function and connectivity. Specifically, the present invention indicates to a method which is convenient for establishing connection(s) between telephone exchanges. On the other hand, the present invention is advantageous for updating and maintaining the connection(s) of telephone exchanges therebetween.

BACKGROUND OF RELATED ARTS

In the well-known telephony network, the telephone exchanges are connected and communicated with each other via PSTN (Public Switched Telephone Network). However, the telephone exchange which uses the PSTN may need to pay higher telecommunication charges.

On the other hand, situation such as the enterprise had set up large numbers of PBX which are old and lesser functions, under the pressure of limited budgets, the enterprise has difficulty to replace such numbers of old PBX systems with newer telephone exchanges. It features and applications such as the encrypt and decrypt communications, etc., which the modern PBX offered.

In light of keeping the original telephone exchanges without retire and to save telecommunication charges, and further extends the applicable functions of the original telephone exchange are the research objectives of technical.

SUMMARY

The main purpose of the present invention is to provide a method of extending PBX communication function and connectivity. The PBX can connect and establish communication network other than PSTN.

Another purpose of the present invention is to provide a method of extending PBX communication function and connectivity. The edge device(s) connected with the telephone exchange is allowed to inquire and automatically updates the edge device data list per se, therefore to establish the connections rapidly.

The other purpose of the present invention is to provide a method of extending PBX communication function and connectivity. The original telephone exchange can be extended with new functions.

To realize the abovementioned purposes, the present invention is to provide a method of extending PBX communication function and connectivity. The present invention is operated under an environment established by a plurality of edge devices, a plurality of telephone exchanges, a plurality of telephones and a main server. Thereinafter, each of the telephone exchange is electrically connected with the edge device correspondingly and each of the telephone exchange is electrically connected with the at least one telephone. Furthermore, the plurality of edge devices are connected with the main server via an internet. The method comprises the following steps:

(A) execute an initial setting procedure which comprises:
 (A1) register the plurality of edge devices with the main server;
 (A2) create an edge device data list in the main server;
 (A3) the main server sends the edge device data list to the plurality of edge devices;
(B) when a new added edge device connects to the main server or one of the plurality of edge devices via the internet, a device renewal procedure is executed. The new added edge device is electrically connected with a new added telephone exchange which corresponds with the new added edge device, and the new added telephone exchange is electrically connected with at least one new added telephone. Moreover, the device renewal procedure comprises the following steps:
 (B1) when the new added edge device connects to the main server, the new added edge device is registered to the main server, and the main server updates data of the new added edge device in the edge device data list, then the main server sends the edge device data list to the plurality of edge devices and the new added edge device; and
 (B2) when the new added edge device connects to the one of the plurality of edge devices, the new added edge device is registered to the one of the plurality of edge devices, and one of the plurality of edge devices updates the data of the new added edge device in the edge device data list, then the one of the plurality of edge devices sends the edge device data list to multiple edge devices which are selected from a group of the plurality of edge devices and the new added edge device.

The features, advantages, or similar expressions of the present invention are not to be construed as being limited by the single scope of the embodiment of the present invention. Please notice that the specific features, advantages, or characteristics described in the embodiments are included in at least one embodiment of this invention. Therefore, the description of features, advantages, and similar expressions therein current specification are related to the same specific embodiments but are not essential.

The following description, the attached claims or the description of the embodiments may be referred and therefore to realize the advantages of the present invention.

DETAILED DESCRIPTION OF THE INVENTION

In order to make the description of the present disclosure more detailed and complete, the following description provides an illustrative description for the implementation and specific embodiments of the present invention. However, the following description is not the only form of implementing or using specific embodiments of the invention. In these paragraphs, the features of various specific embodiments are covered as well as the method steps and sequences for constructing and operating these specific embodiments. However, the other embodiments may also be utilized to achieve the same or equivalent function and sequence of steps.

The present invention discloses a method of extending PBX communication function and connectivity. The present invention may use the original telephone exchange to execute the communication via network other than PSTN connection. On the other hand, the edge device(s) connected with the telephone exchange is allowed to inquire the related edge devices and automatically updates the edge device data list per se, therefore to establish the connections rapidly. On the other hand, the present method of extending PBX communication function and connectivity may further extend new applicable functions for the exist telephone exchange(s).

Figure 1:
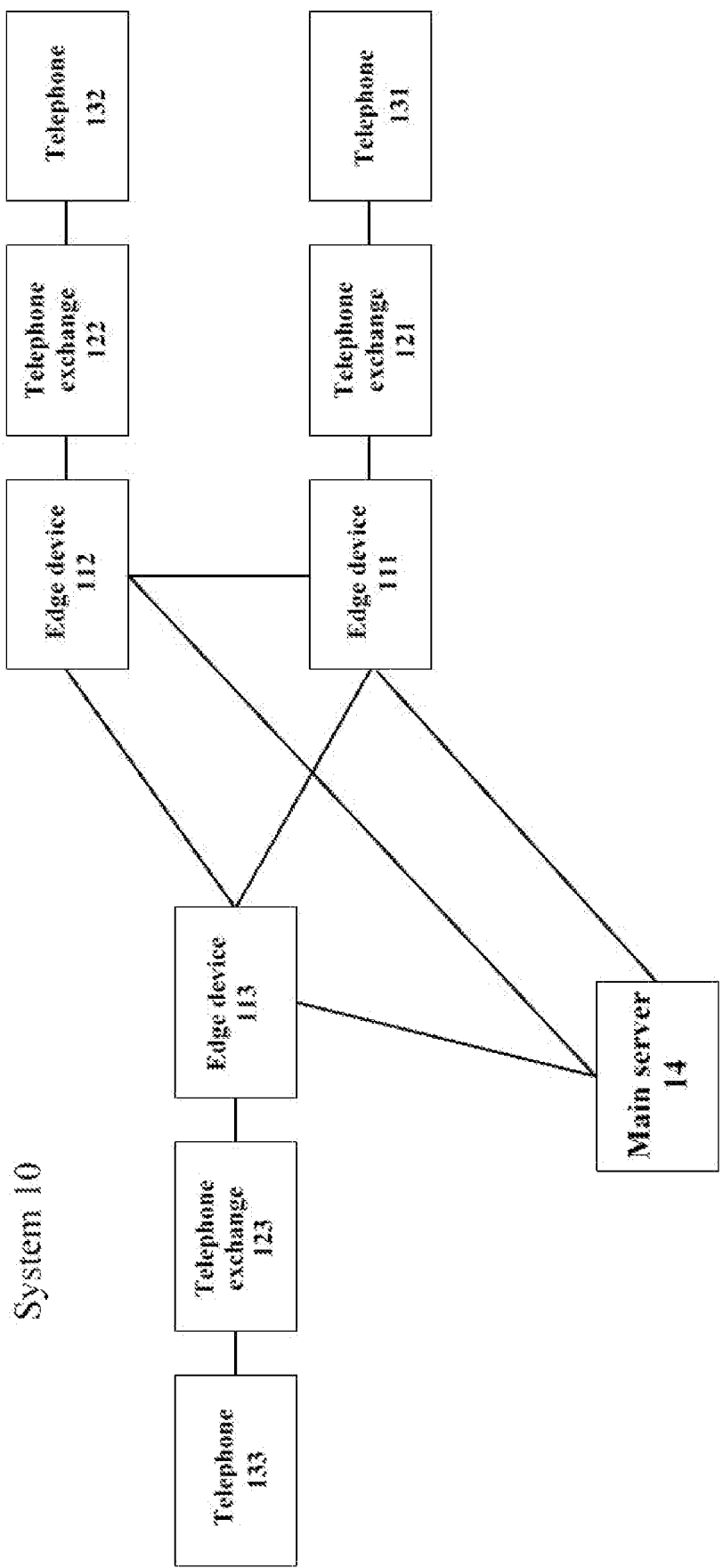
FIG. 1 illustrates a schematic system architecture diagram of the first preferable embodiment of the system of extending PBX communication function and connectivity.

Please refer to FIG. 1, the FIG. 1 illustrates a schematic system architecture diagram of the first preferable embodiment of the system of extending PBX communication function and connectivity. As shown in FIG. 1, the system 10 comprises a plurality of edge devices 111 to 113, a plurality of telephone exchanges 121 to 123, a plurality of telephones 131 to 133, and a main server 14. The plurality of edge devices 111, 112 and 113 are electrically connected with the plurality of telephone exchanges 121, 122 and 123 individually, and the plurality of telephone exchanges 121, 122 and 123 are electrically connected with the plurality of telephones 131, 132 and 133 individually, too. Furthermore, the plurality of edge devices 111 to 113 connects to main server 14 via network therebetween.

Figure 2:
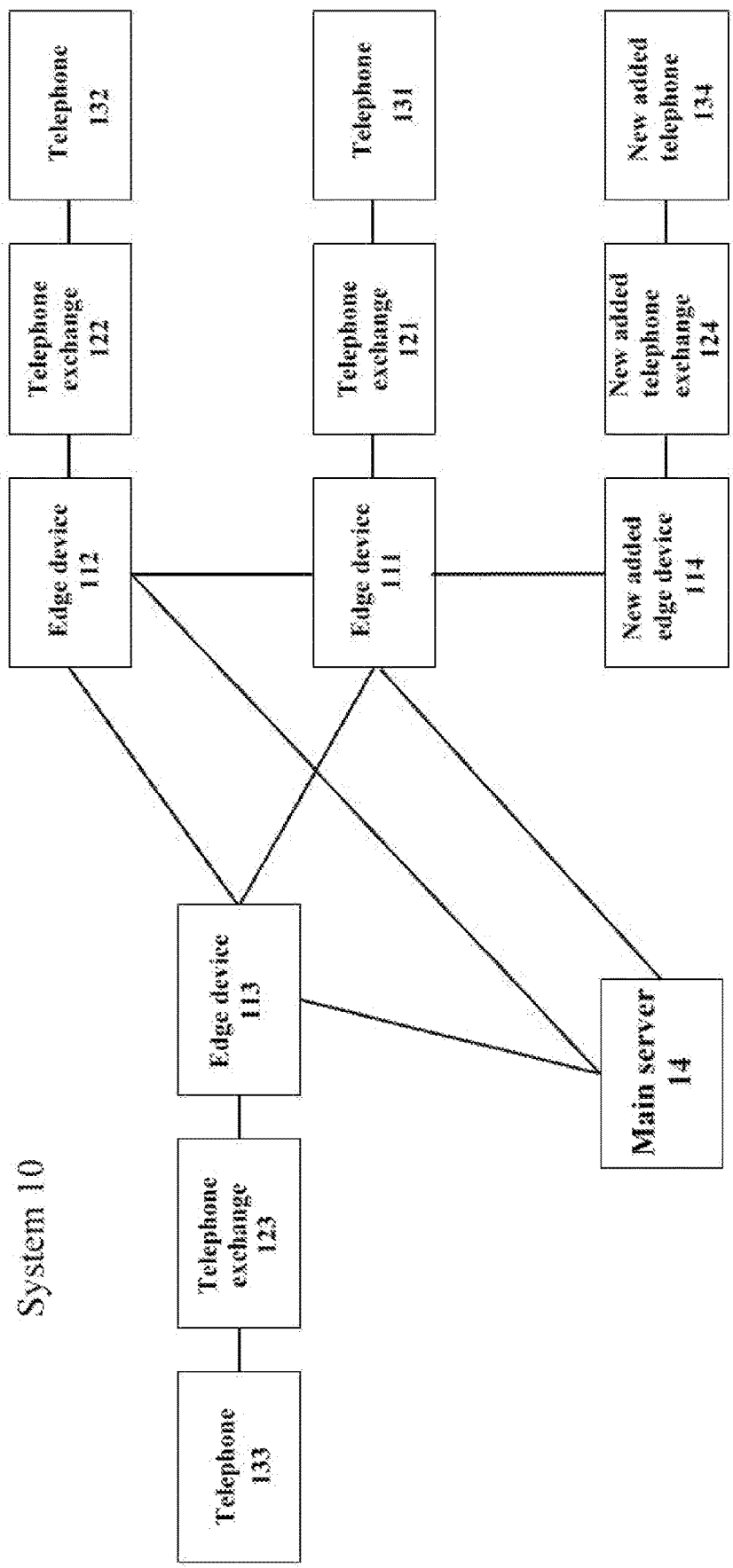
FIG. 2 illustrates a schematic system architecture diagram of the second preferable embodiment of the system of extending PBX communication function and connectivity.

Please refer to FIG. 2. FIG. 2 shows the schematic system architecture diagram of the second preferable embodiment of the system of extending PBX communication function and connectivity. As shown in FIG. 2, an edge device 114 is newly added to the system 10. The new added edge device 114 may connect to the main server 14 via internet or to one edge device of the plurality of edge devices 111 to 113. For instance, the connection of edge device 111 has been shown in FIG. 2. The new added edge device 114 is electrically connected with the new added telephone exchange 124, and the new added telephone exchange 124 is electrically connected with the newly added new added telephone 134, too.

Figure 3:
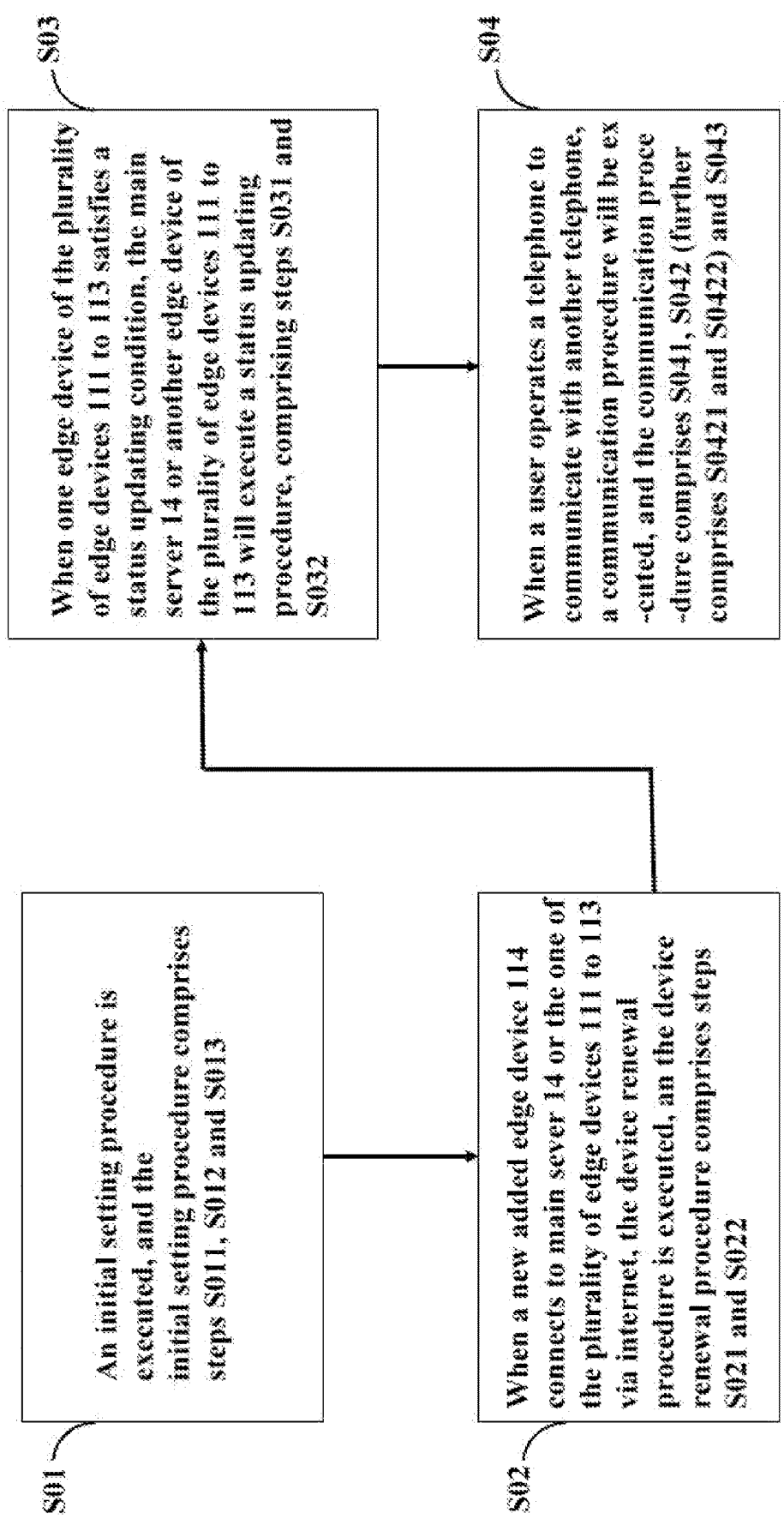
FIG. 3 illustrates a flow chart of the first preferable embodiment of the method of extending PBX communication function and connectivity.

Please see FIG. 3. FIG. 3 illustrates a flow chart of the first preferable embodiment of the method of extending PBX communication function and connectivity. Please refer to FIG. 1, FIG. 2 and FIG. 3 simultaneously, for understanding the following description. The use and functions of every device will be described in the following flow chart. Please note the following flow chart is that with different needs the order of steps would be altered or skip.

Please see the step S01 (FIG. 1 and FIG. 3), an initial setting procedure is executed. The initial setting procedure comprises the following steps: Step S011, a plurality of edge devices 111 to 113 are registered with the main server 14. Step S012, the main server 14 creates an edge device data list. The edge device data list comprises the data of every edge device. The data of every edge device may comprise: IP address, company name, company department(s), authentication code, and access code, etc., however the present invention is not limited thereto. In step S013, the main server 14 sends the edge device data list to the plurality of edge devices 111 to 113. Therefore, the plurality of edge devices 111 to 113 independently has a copy of its own edge device data list. The IP addresses of the plurality of edge devices 111 to 113 may be the address of default main server 14, or the IP address of main server 14 which is entered by user(s). Once the plurality of edge devices 111 to 113 connects to internet, the plurality of edge devices 111 to 113 will be registered with main server 14 via the internet.

The edge device data list (not shown in drawings) created by main server 14 may comprises a universal edge device data list and a unique edge device data list. The universal edge device data list is used for saving the data of edge devices which have no specific relationships. For example, main server 14 saves the data of the plurality of edge devices 111 to 113 to the universal edge device data list in initial setting procedure, because the plurality of edge devices 111 to 113 are not specifically related. For the other example, any edge device in the system 10 of the present invention may receive the data which is sent by and related to the other edge devices (the following description will explain). If the data of the corresponded edge device is not related to the present edge device, the data will be saved to the universal edge device data list.

On the other hand, the unique edge device data list is used for saving the data of edge device which is specifically related. For instance, any edge device receives the data of edge device which belongs to the same company but different department, the data will be save to the unique edge device data list. And also, any edge device receives the data of the edge devices of the affiliated company of the present company, the data will be saved to unique edge device data list, too.

In step S02 (please refer to FIG. 2 and FIG. 3), when a new added edge device 114 connects to main server 14 or one edge device of the plurality of edge devices 111 to 113 via internet, a device renewal procedure is executed. The new added edge device 114 is electrically connected with a corresponded new added telephone exchange 124, and the new added telephone exchange 124 is electrically connected with at least one new added telephone 134.

The device renewal procedure comprises the following steps:

In step S021, when the new added edge device 114 is connected to the main server 14, the new added edge device 114 is registered at the main server 14. Thereafter, the main server 14 updates the data of the new added edge device 114 in the edge device data list of the main server 14. The main server 14 further sends the edge device data list to the plurality of edge devices 111 to 113 and new added edge device 114. In addition, when the new added edge device 114 is not related to the plurality of edge devices 111 to 113, then the edge device data list sent by the main server 14 will update the universal edge device data list of the plurality of edge devices 111 to 113 and new added edge device 114.

In step S022, when the new added edge device 114 is connected to one edge device of the plurality of edge devices 111 to 113 (e.g., the edge device 111 of FIG. 2), the new added edge device 114 is registered at the edge device 111. The edge device 111 updates the data of the new added edge device 114 in the edge device data list of the edge device 111. Moreover, the edge device 111 further sends the edge device data list to multiple edge devices of the edge device 112, 113 and the new added edge device 114 therebetween. For instance, the multiple edge devices may be the edge device 112 and the new added edge device 114. Furthermore, when the new added edge device 114 is related to the edge device 111 and 112 (e.g. the new added edge device 114, edge device 111 and 112 belong to the same company), and the edge device 111 will updates the data of the new added edge device 114 in the unique edge device data list of the edge device 111 per se, and the content of the edge device data list sent by the edge device 111 will updates the unique edge device data list of the edge device 112 and new added edge device 114, too.

In the abovementioned step S022, the determination methods of sending the edge device data list of edge devices 111 per se to multiple edge devices which are selected from a group of the edge devices 112, 113 and the new added edge device 114 may be the multiple edge device(s) which has/have been communicated with the edge device 111 in certain period (e.g. 3 hours), or the edge devices with certain numbers (e.g. 50 edge devices) which have been communicated with the edge device 111. The determination method is not limited in the present invention thereto.

In step S03, when one edge device of the plurality of edge devices 111 to 113 (e.g., the edge device 113) satisfies a status updating condition, the main server 14 or another edge device of the plurality of edge devices 111 to 113 (e.g., the edge device 112) will execute a status updating procedure. The status updating procedure comprises the following steps:

The step S031 states that the edge device 112 edits the access code of the edge device 113 of the plurality of edge devices in the edge device data list per se. Please note that every edge device data lists of the main server 14, the plurality of edge devices 111 to 113, and the new added edge device 114 all comprise the authentication code and access code of the recorded edge devices. The authentication code is used for recognizing the identity of edge device, and the access code is used for checking the service authority which can be acquired or provided for the edge device. Thereafter, the step S032 states that the edge device 112 sends the access code to edge device 113, and the edge device 113 updates the edge device data list per se with the new access code.

For instance, in one embodiment of the present invention, the edge device 112 and 113 belong to the same company. Specifically, the edge device 112 is managed by the headquarters (or parent company), and the edge device 113 is managed by branch(es) (or child company). When the headquarters allows the telephone 133 of branch (telephone 133 and telephone exchange 123 are electrically connected with the edge device 113) making international calls. It means that the edge device 113 satisfies a status updating condition. Therefore, the operating staff of headquarters edits the access code of edge device 113 which is recoded in the plurality of edge devices of the edge device data list of edge device 112 per se. The access code means the authorization of making international calls. Thereafter, the edge device 112 sends the access code to the edge device 113, and the edge device 113 updates the edge device data list per se via the aforementioned access code.

Otherwise, in another embodiment of the present invention, the enterprise having the edge device 111 has terminated the cooperation with the management company which has the main server 14, meaning that the edge device 111 satisfies a status updating condition. Therefore, the management staff of the management company edits the access code of edge device 111 recorded in the edge device data list of the main server 14 per se, terminating the services provided to the edge device 111. The main server 14 then sends the access code to the edge device 111, and the edge device 111 updates the access code in the edge device data list per se. It should be noticed that the status updating condition mentioned in the present invention is not limited thereto.

In step S04, when a user operates a telephone (e.g., the new added telephone 134) to communicate with another telephone (e.g., the telephone 133), a communication procedure will be executed. The communication procedure comprises the following steps: Step S041, the user operates the new added telephone 134 and enters a target phone number then send to the new added telephone exchange 124. The telephone exchange 124 further sends the target phone number to the edge device 114. The aforementioned target phone number corresponds to the telephone 133. The step S042 is that the edge device 114 executes an inquiring procedure via the target phone number, acquiring the data of the edge device 113 which corresponds to the aforementioned target phone number. Thereafter, the step S043 establishes the network communicating connection between the new added telephone 134 and telephone 133 via the data of the edge device 113. Specifically, the telephone exchange 123 is electrically connected with the telephone 133, and the telephone exchange 123 is electrically connected with the edge device 113, too.

In the abovementioned step S042, the inquiring procedure further comprises the following steps: The step S0421 is that the edge device 114 inquires the edge device data list per se according to the target phone number. If the data of edge device 113 which corresponds to the target phone number exist, the step S043 will be executed thereon. However, if the data of another edge device which corresponds to the target phone number which does not exist, the step S0422 will be executed. The S0422 is that the edge device 114 sends the target phone number the qualified edge device, then the qualified edge device inquires the edge device data list per se. Thereafter, if the data of edge device 113 corresponded to the target phone number exist, the data of the edge device 113 will be sent back to the edge device 114. The edge device 114 will update the data of the edge device 113 in the edge device data list per se, then execute step S043. However, in one embodiment of the present invention, the new added telephone 134 connected with the edge device 114 needs to make a call to the telephone 133 connected with the edge device 113, indicating that the edge device 114 may relate to the edge device 113. Hence, the edge device 114 updates the data of the edge device 113 in the unique edge device data list per se.

The qualified edge device mentioned in step S0422 comprises: the edge device which has been communicating with the edge device 114 in certain time/period, edge device(s) with certain number which has/have been communicating with the edge device 114, and the edge device(s) listed on the edge device data list of the edge device 114 per se. One or the combinations of the edge device(s) mentioned above may be regarded as the qualified edge device(s).

On the other hand, step S0422 further comprises that if the qualified edge device inquires the data of the edge device 113 which is not corresponded to target phone number in the edge device data list per se, then each of the qualified edge devices sends the target phone number to the qualified edge device connected them thereon, until the data of edge device 113 corresponded to the target phone number has been inquired in the edge device data list of at least one inquired edge device and the data of the edge device 113 will be sent back to the edge device 114. The edge device 114 updates the data of the edge device 113 in the edge device data list per se, and then execute the step S043. It should be understood that the edge device having the data of edge device 113 may send the data of edge device 113 to the edge device 114 directly, or the edge device having the data of edge device 113 may send the data of edge device 113 backward to the edge device 114 via the reversal of inquiring route from the connected qualified edge device(s).

The step S0422 further comprises that when specific updating requirement has been satisfied, the edge device 114 sends the data of the edge device 113 to all or part of the qualified edge device(s), and all or part of the qualified edge device(s) updates the edge device data list(s) per se via the data of the edge device 113. The specific updating requirement may be the certain period of time (e.g., per 3 hours) or the data with certain numbers of records (e.g., per 20 records of data), however the present invention is not limited thereto.

The step S0422 further comprises that the qualified edge device inquires the edge device data list per, if the data of the edge device 113 corresponded to the target phone number exists in the edge device data list of an edge device, then the edge device determines whether to send the data of the edge device 113 back to the edge device 114 according to the authentication code of edge device 114. For example, if the edge device and edge device 114 are competitors or the edge device 114 has been blocked by the edge device, the edge device may not send the data of the edge device 113 back to the edge device 114 according to the authentication code of the edge device 114.

The step S0422 further comprises that the edge device 113 determines whether to allow establishing network communicating connection between the new added telephone 134 and telephone 133 via the authentication code and access code of edge device 114. In other words, if the edge device 113 and the edge device 114 are the competitors therebetween or the edge device 114 has been blocked by the edge device 113, the edge device 113 may determines to deny the communicating connection between the new added telephone 134 and telephone 133 via the authentication code and access code of edge device 114.

For example, the edge device 114 of step S0421 inquires the edge device data list per se according to the target phone number, if the data of edge device 113 corresponded to the target phone number exist, then the step S043 is allowed and the network communicating connection between the new added telephone 134 and the telephone 133 will be established. Moreover, the edge device 114 updates the data of the edge device 113 in the unique edge device data list per se. However, if the edge device 114 of step S0421 fail to inquire the data of the edge device 113, the edge device 114 alternatively execute the step S0422, sending the target phone number to the qualified edge device(s) such as the edge device 111.

Thereafter, the qualified edge device 111 inquires the edge device data list per se. If the data of edge device 113 corresponded to the target phone number exist therein, the data of the edge device 113 will be sent back to the edge device 114. However, if the qualified edge device 111 inquires the edge device data list per se and the data of edge device 113 corresponded to the target phone number which does not exist therein. The edge device 111 may send the target phone number to qualified edge device(s) which is/are connected to the edge device 111. For instance, the qualified edge device(s) which is/are in the outer layer of the edge device 111 may be the edge device 112. Thus the edge device 112 inquires the edge device data list per se. If the data of the edge device 113 corresponded to target phone number exists, then the data of the edge device 113 will be sent back to the edge device 114. However, if the data of the edge device 113 does not exist in the edge device data list of the edge device 112, the edge device 112 may further send the target phone number to the qualified edge device(s) in the outer layer of edge device 112, until the data of the edge device 113 corresponded to the target phone number has been inquired, and exists in the edge device data list of at least one edge device.

It should be understood that there are only four edge devices 111 to 114 have been illustrated in FIG. 2. However, the real system 10 may include hundreds or thousands of edge devices, and the telephone exchanges and telephones which are electrically connected with the aforementioned edge devices. Therefore, the edge device data lists of the qualified edge devices may be inquired layer by layer, until the data of the edge device 113 corresponded to target phone number has been inquired. For example, the edge device 112 inquires the edge device data list per se. If the data of the edge device 113 corresponded to the target phone number exists, then the edge device 112 determines whether to send the data of the edge device 113 back to the edge device 114 according to the authentication code of edge device 114. Otherwise, if the edge device 112 and edge device 114 are owned by the same enterprise, then the edge device 112 may send the data of the edge device 113 back to the edge device 114 according to the authentication code of the edge device. On the other hand, if the edge device 112 and the edge device 114 are independently owned by the competitors, then the edge device 112 will not send the data of edge device 113 back to the edge device 114 according to the authentication code of the edge device 114. Specifically, the edge device 113 can still determines whether to allow the establishing of network communicating connection between the new added telephone 134 and telephone 133, although the edge device 114 has received the data of the edge device 113 and requires the establishing of network communicating connection between the new added telephone 134 and telephone 133.

As described above, the present invention discloses a method of extending PBX communication function and connectivity. The present invention may use the original telephone exchange to execute the communication on internet other than the PSTN connection. The edge device connected with the telephone exchange is allowed to inquire and automatically updates the edge device data list per se, therefore to establish the connections rapidly. On the other hand, the present method of extending PBX communication function and connectivity can further extend new applicable functions. For instance, the edge device may have the functions of data encryption and decryption. When the telephone exchange communicates with the edge device, the communication therebetween will be encrypted. Moreover, the advanced functions provided by edge device such as the multimedia communication, leading the communications between the telephone exchanges to have the aforementioned advanced functions, too.

Various embodiments of the disclosed techniques have been described above. It should be understood that the embodiments have been presented by real case and are not limiting. Likewise, the actual architecture of the disclosed techniques in the various figures, or their configurations, may be depicted to aid in understanding the features and functionality that may be included in the disclosed technology. The disclosed technology is not limited to the illustrated embodiment architectures or configurations. Essential technical features in this embodiment may be implemented using a variety of alternatives or configurations. It will be apparent to the skilled person in the art, understanding the functional, logical, or physical partitioning and configurations may implement the desired features of the techniques disclosed herein. In addition, the flowcharts or operational descriptions and methods of the present invention, each step the order of presentation should not limit the technology disclosed herein. The order of steps in the implementation of the invention should not limit its functionality unless context dictates otherwise.

The above-mentioned descriptions are only preferred embodiments of the present invention and are not intended to limit the scope of implementation of the present invention. Therefore, all the shapes, structures, features and spirits described in the scope of the patent application of the present invention shall be regard as equivalent to the changes and modifications per se and be included in the scope of the patent application of the present invention.

What is claimed is:

1. A method of extending PBX communication function and connectivity, operated under an environment established by a plurality of edge devices, a plurality of telephone exchanges, a plurality of telephones and a main server; wherein each of the telephone exchange is electrically connected with the edge device correspondingly and each of the telephone exchange is electrically connected with at least one telephone; wherein the plurality of edge devices is connected with the main server via an internet; wherein the method of extending PBX communication function and connectivity comprises:
   (A) executing an initial setting procedure which comprises:
      (A1) registering the plurality of edge devices with the main server;
      (A2) creating an edge device data list in the main server;
      (A3) the main server sending the edge device data list to the plurality of edge devices;
   (B) in response to a new added edge device connects to the main server or one of the plurality of edge devices via the internet, a device renewal procedure is executed; wherein the new added edge device is electrically connected with a new added telephone exchange which corresponds with the new added edge device, and the new added telephone exchange is electrically connected with at least one new added telephone; wherein the device renewal procedure comprises:
      (B1) in response to the new added edge device connects to the main server, the new added edge device is registered to the main server, and the main server updates data of the new added edge device in the edge device data list, then the main server sends the edge device data list to the plurality of edge devices and the new added edge device; and
      (B2) in response to the new added edge device connects to the one of the plurality of edge devices, the new added edge device is registered to the one of the plurality of edge devices, and the one of the plurality of edge devices updates the data of the new added edge device in the edge device data list, then the one of the plurality of edge devices sends the edge device data list to multiple edge devices which are selected from a group of the plurality of edge devices and the new added edge device.

2. The method of extending PBX communication function and connectivity as claimed in claim 1, wherein the edge device data list in the plurality of edge devices and the new added edge device both comprise with a universal edge device data list and a unique edge device data list.

3. The method of extending PBX communication function and connectivity as claimed in claim 2, wherein the step (B1) further comprises that content of the edge device data list sent by the main server will update the universal edge device data list in the plurality of edge devices and the new added edge device.

4. The method of extending PBX communication function and connectivity as claimed in claim 2, wherein the step (B2) further comprises that content of the edge device data list sent by the one of the plurality of edge devices will update the unique edge device data list in the multiple edge devices which are selected from the group of the plurality of edge devices and the new added edge device.

5. The method of extending PBX communication function and connectivity as claimed in claim 2, wherein the method further comprises following steps:
   (C) in response to the one edge device of the plurality of edge devices satisfies the status updating condition, the main server or another edge device of the plurality of edge devices executes a status updating procedure; wherein the status updating procedure comprises following steps:
      (C1) the main server or the another edge device of the plurality of edge devices edits access code of the one edge device of the plurality of edge devices recorded in the edge device data list which belongs to the main server or the another edge device per se, each of access code of the edge device data list of the main server or the plurality of edge devices comprises recorded authentication code and the access code of the edge device; wherein the authentication code is used for recognizing identity of the edge device, and the access code is used for checking service authority which can be acquired or provided; and
      (C2) the main server or the another edge device of the plurality of edge devices sends the access code to the one edge device of the plurality of edge devices, and the one edge device updates the access code of the edge device data list per se.

6. The method of extending PBX communication function and connectivity as claimed in claim 5, wherein the method further comprises following steps:
   (D) in response to a user operates a certain telephone to communicates with another certain telephone, a communication procedure is executed; wherein the communication procedure comprises following steps:
      (D1) the user operates the certain telephone to enter a target phone number and the certain telephone sends the target phone number to a certain telephone exchange, the certain telephone exchange further sends the target phone number to a certain edge device; wherein the certain telephone exchange is electrically connected with the certain telephone, and the certain telephone exchange is electrically connected with the certain edge device; wherein the target phone number is corresponded to the another certain telephone;
      (D2) the certain edge device executes an inquiring procedure via the target phone number, acquiring data of the another edge device which is corresponded to the target phone number; and
      (D3) according to the data of the another edge device, the certain telephone establishes the connection with the another certain telephone via the internet; wherein an another telephone exchange is electrically connected with the another telephone, and the another telephone exchange is electrically connected with the another edge device.

7. The method of extending PBX communication function and connectivity as claimed in claim 6, wherein the inquiring procedure comprises following steps:
- (D21) the certain edge device inquires the edge device data list per se based on the target phone number; in response to the data of the another edge device which corresponds to the target phone number exists, executing step (D3); in response to the data of the another edge device corresponds to the target phone number which does not exists, executing step (D22); and
- (D22) the certain edge device sends the target phone number to qualified edge devices, the qualified edge devices inquire the edge device data list per se; in response to the data of the another edge device which corresponds to the target phone number exists, sending the data of the another edge device to the certain edge device, and the certain edge device updates the data of the another edge device to the edge device data list per se, then execute step (D3).

8. The method of extending PBX communication function and connectivity as claimed in claim 7, wherein the step (D22) further comprises: the certain edge device updates the data of the another edge device to the unique edge device data list per se.

9. The method of extending PBX communication function and connectivity as claimed in claim 7, wherein the step (D22) further comprises: in response to the qualified edge devices inquire the edge device data list per se and the data of the another edge device corresponded to the target phone number which does not exists in the edge device data list, then each of the qualified edge devices independently sends the target phone number to the qualified edge devices connected to each of the qualified edge devices in an outer layer until the data of the another edge device which is corresponded to the target phone number exist in the edge device data list of at least one inquired edge device per se, and the data of the another edge device is sent to the certain edge device, the certain edge device updates the data of the another edge device to the edge device data list per se and executes step (D3).

10. The method of extending PBX communication function and connectivity as claimed in claim 7, wherein the qualified edge devices comprise one or combinations as follows: the edge device(s) which has/have been communicated with the certain edge device, certain number of the edge device(s) which has/have been communicated with the certain edge device, or the edge device(s) listed on the edge device data list of the certain edge device per se.

11. The method of extending PBX communication function and connectivity as claimed in claim 7, wherein the step (D22) further comprises: after the qualified edge devices inquire the edge device data list per se, in response to the data of the another edge device corresponded to target phone number exists in the edge device data list of a specific edge device, then the specific edge device determines whether to send the data of the another edge device back to the certain edge device via the authentication code of the certain edge device.

12. The method of extending PBX communication function and connectivity as claimed in claim 7, wherein the step (D3) further comprise: the another edge device determines whether to allow the certain telephone to establish the connection via the internet with the another telephone via the authentication code and the access code of the certain edge device.

13. The method of extending PBX communication function and connectivity as claimed in claim 7, wherein the step (D22) further comprises: in response to specific updating requirement has been satisfied, the certain edge device sends the data of the another edge device to all or part of the qualified edge device(s), and all or part of the qualified edge device(s) updates the edge device data list list(s) per se based on the data of the another edge device.

14. The method of extending PBX communication function and connectivity as claimed in claim 1, wherein the step (B2) further comprises that the one of the plurality of edge devices sends the edge device data list to the multiple edge devices which are selected from the group of the plurality of edge devices and the new added edge device, and the multiple edge devices have been successfully communicated with the one of the plurality of edge devices in certain period.

15. The method of extending PBX communication function and connectivity as claimed in claim 1, wherein the step (B2) further comprises that the one of the plurality of edge devices sends the edge device data list to the multiple edge devices which are selected from the group of the plurality of edge devices and the new added edge device, and the multiple edge devices are indicated to certain number edge devices which have been successfully communicated with the one of the plurality of edge devices.

\* \* \* \* \*